United States Patent
Kim (10) Patent No.: US 7,376,194 B2
(45) Date of Patent: May 20, 2008

(54) METHOD AND APPARATUS FOR COMPENSATING FOR RESIDUAL FREQUENCY OFFSET IN AN OFDM SYSTEM

(75) Inventor: Ki-Yun Kim, Gwangmyeong-si (KR)

(73) Assignee: Samsung Thales Co., Ltd (KR)

( * ) Notice: Subject to any disclaimer, the term of this patent is extended or adjusted under 35 U.S.C. 154(b) by 765 days.

(21) Appl. No.: 10/838,123

(22) Filed: May 3, 2004

(65) Prior Publication Data
US 2005/0129135 A1    Jun. 16, 2005

(30) Foreign Application Priority Data
Dec. 15, 2003  (KR) ............... 2003-91436

(51) Int. Cl.
*H04K 1/10* (2006.01)
(52) U.S. Cl. ............... 375/260; 375/344; 375/362
(58) Field of Classification Search ............... 375/260, 375/344, 362
See application file for complete search history.

(56) References Cited

U.S. PATENT DOCUMENTS 5,694,389 A * 12/1997 Seki et al. ............... 370/208
6,151,369 A * 11/2000 Ohkubo et al. ............... 375/332
6,373,861 B1 * 4/2002 Lee ............... 370/503

OTHER PUBLICATIONS

Kim, "A novel residual carrier synchronization technique for M-QAM-OFDM in the presence of intercarrier interference", 2003 IEEE International Conference on Consumer Electronics, 2003. ICCE, Jun. 17-19, 2003 pp. 232-233.*

* cited by examiner

*Primary Examiner*—Mohammed Ghayour
*Assistant Examiner*—Juan Alberto Torres
(74) *Attorney, Agent, or Firm*—The Farrell Law Firm, PC (57) ABSTRACT

Disclosed is a method for compensating for a residual frequency offset in an orthogonal frequency division multiplexing system comprising the steps of: a) performing a fast fourier transform for an input signal to convert the input signal into a serial signal; b) detecting signal power of the serial signal to control the passthrough a signal greater than a predetermined critical value; c) selecting each section of a quadrant for each passed signal; d) estimating a phase error in each section of the quadrant for one orthogonal frequency division multiplexing symbol with respect to the selected section of the quadrant; and e) frequency-oscillating a signal based on the estimated phase error, generating the input signal by multiplying an oscillated signal by a band-passed signal, and then returning to step a).

7 Claims, 7 Drawing Sheets

METHOD AND APPARATUS FOR COMPENSATING FOR RESIDUAL FREQUENCY OFFSET IN AN OFDM SYSTEM

PRIORITY

This application claims priority to an application entitled "Method And Apparatus For Compensating For Residual Frequency Offset In OFDM System" filed in the Korean Intellectual Property Office on Dec. 15, 2003 and assigned Serial No. 2003-91436, the contents of which are incorporated herein by reference.

BACKGROUND OF THE INVENTION

1. Field of the Invention

The present invention relates to an orthogonal frequency division multiplexing (hereinafter, referred to as an OFDM) system, and more particularly to an apparatus and a method for compensating for residual frequency offset in an OFDM system.

2. Description of the Related Art

The present OFDM technology is a promising communication technology applied to various fields such as Digital Audio Broadcastings (DABs), Digital Video Broadcastings (DVBs), or high-rate wireless local area networks (LANs).

Such an OFDM system can transmit a great amount of information through a bandwidth defined by applying a high-order quadrature amplitude modulation (hereinafter, referred to as a QAM) such as a QPSK, a 16 QAM, a 64 QAM, or a 256 QAM to a subcarrier. However, the current OFDM system is sensitive to a frequency offset due to a doppler spread or a frequency disagreement of local frequency oscillators between a transmitter and a receiver resulting in transmission errors.

Particularly, the frequency offset in the OFDM system interferes with the orthogonality between subcarriers and causes an intercarrier interference (hereinafter, referred to as an ICI), thereby causing an amplitude reduction and a phase rotation of a signal.

Even after a fine frequency is estimated within +/−0.5 of the frequency offset of a subcarrier interval in the OFDM system, a residual frequency offset and a phase offset still remain. The residual frequency offset causes the ICI between subcarriers and the deterioration of a bit error rate (hereinafter, referred to as a BER) performance.

A DVB-T system will be described as an example. Even though approximate frequency synchronization that compensates for frequency values corresponding to subcarrier intervals and a fine frequency offset compensation that compensates for a frequency within the subcarrier interval are performed, the phase rotation due to the residual frequency offset and phase noise still remains. As a result, the BER performance is deteriorated by the ICI.

A conventional OFDM system such as a DVB-T compensates for a frequency offset by performing the capture and tracing of the frequency offset by periodically inserting a plurality of pilot bits into an OFDM symbol. Such a method exhibits good BER performance by performing a synchronization modulation. However, since the pilot information is inserted into a data transmission segment, data transmission efficiency is inevitably reduced. Compensation for a carrier offset and a phase offset is often performed on data by a decision-directed (hereinafter, referred to as a DD) method.

However, such a DD method cannot compensate for unfavorable circumstances such as a Rayleigh fading channel in a DVB-T system because the frequency capture range is narrow.

In the conventional DD method, a phase difference between a received signal and a hard-decided representative signal for each symbol is obtained by the following Equation 1. A phase error $\psi(m)$ for an $m^{th}$ OFDM symbol using the DD method is expressed as:

$$\psi(m) = \frac{1}{N} \sum_{k=0}^{N-1} \text{Im}\left[\frac{Y_m(k)}{\hat{X}_m(k)}\right] \quad (1)$$

where, Im represents an imaginary part of [x], $Y_m(k)$ is a $k^{th}$ subcarrier of an fast fourier transform (hereinafter, referred to as an FFT) demodulated $m^{th}$ symbol, and $\hat{X}_m(k)$ represents a hard-decided, estimated transmission signal of the FFT demodulated signal $Y_m(k)$.

Although the phase error is detected through Equation 1, frequency capture performance of the DD method deteriorates as an order 'M' in an Multi-level-QAM (hereinafter, referred to as an M-QAM) increases. This is because the number of M-QAM signals which are not located on a diagonal axis increase when the order 'M' increases. Accordingly, the DD method is not suitable for tracking the residual frequency offset in a high-order QAM.

SUMMARY OF THE INVENTION

The present invention has been proposed to solve the above-mentioned and other problems occurring in the prior art, and an object of the present invention is to provide an apparatus and a method for compensating for a frequency offset and a phase offset in an OFDM system, which can estimate a residual frequency offset using an M-QAM data symbol without using a known symbol such as an existing pilot.

The present invention provides a new phase synchronization algorithm capable of compensating for a residual frequency and a phase error through a quadrant decision in an M-QAM-OFDM system.

In order to accomplish the aforementioned objects, according to one aspect of the present, there is provided a method for compensating for a residual frequency offset in an orthogonal frequency division multiplexing system, comprising the steps of: a) performing a fast fourier transform for an input signal to convert the input signal into a serial signal; b) detecting signal power of the serial signal to control a signal greater than a predetermined critical value to pass; c) selecting each section of a quadrant for a signal which has been passed in step b); d) estimating a phase error in each section of the quadrant for one orthogonal frequency division multiplexing symbol with respect to the selected section of the quadrant; and e) frequency-oscillating a signal based on the estimated phase error, generating the input signal by multiplying an oscillated signal by a band-passed signal, and then returning to step a).

In order to accomplish the aforementioned objects, according to one aspect of the present invention, there is provided an apparatus for compensating for a residual frequency offset in an orthogonal frequency division multiplexing system, comprising: a fast Fourier transform unit for performing a fast Fourier transform for an input signal to convert the input signal into a serial signal; a power detector for detecting signal power of an output signal of the fast Fourier transform unit to control a signal greater than a predetermined critical value to pass; a quadrant detector for selecting each section of a quadrant for a signal having been passed under the control of the power detector; a phase error estimation unit for estimating a phase error in each section of the quadrant for one orthogonal frequency division multiplexing symbol with respect to the selected section of the quadrant; and a voltage controlled oscillator for frequency-oscillating a signal based on the estimated phase error, generating the input signal by multiplying an oscillated signal by a band-passed signal, and inputting the input signal to the fast Fourier transform unit.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment according to the present invention will be described with reference to the accompanying drawings. In the following description of the present invention, a detailed description of known functions and configuration incorporated herein will be omitted when it may obscure the subject matter of the present invention.

Figure 4:
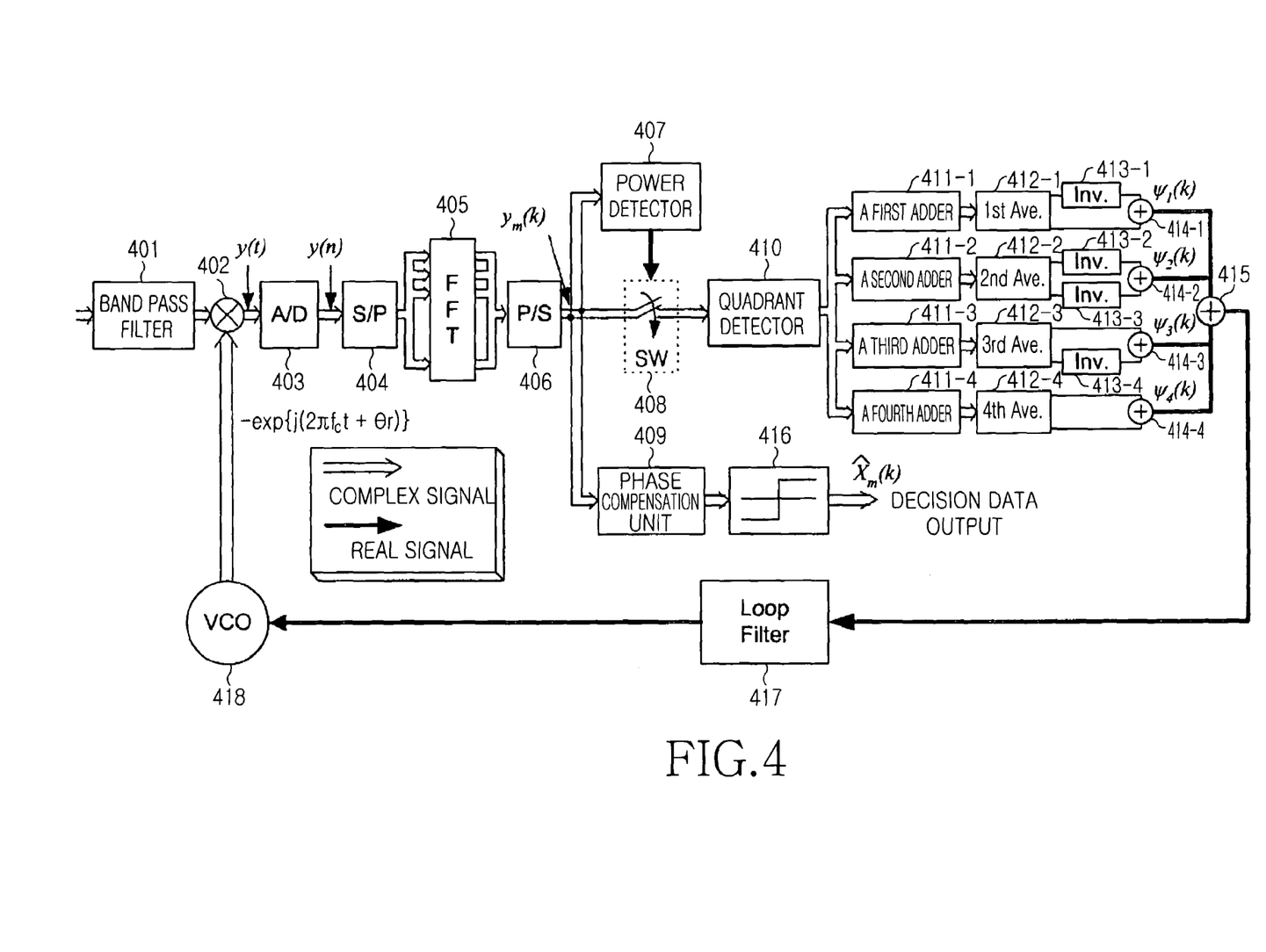
FIG. 4 is a block diagram illustrating a construction of an apparatus for compensating for a residual frequency offset in an OFDM system according to the present invention.

FIG. 4 is a block diagram illustrating a construction of an apparatus for compensating for a residual frequency offset in an OFDM system according to the present invention.

As shown in FIG. 4, the apparatus for compensating for a residual frequency offset in the OFDM system according to the present invention includes a band-pass filter 401, a multiplier 402, an analog to digital converter (hereinafter, referred to as an A/D converter) 403, a serial to parallel converter (hereinafter, referred to as an S/P converter) 404, an FFT unit 405, a parallel to serial converter (hereinafter, referred to as a P/S converter) 406, a power detector 407, a switch 408, a phase compensation unit 409, a hard-decision unit 416, a quadrant detector 410, adders 411-1 to 411-4, averagers 412-1 to 412-4, inverters 413-1 to 413-4, adders 414-1 to 414-4, an adder 415, a loop filter 417, and a voltage controlled oscillator (hereinafter, referred to as a VCO) 418.

The band-pass filter 401 passes an input signal having a predetermined frequency, and the multiplier 402 multiplies an output signal of the VCO 418 by a band-pass signal passing through band-pass filter 401. The A/D converter 403 converts a signal y(t) outputted from the multiplier 402 into a digital signal, and the S/P converter 404 converts a signal y(n) output from the A/D converter 403 into a parallel signal. The FFT unit 405 performs an FFT for each parallel signal, and the P/S converter 406 converts the FFT signals into one serial signal $y_m(k)$. The power detector 407 receives QAM signals contained in each subcarrier of the signal transmitted from the P/S converter 406 so as to allow only signals satisfying the condition $|Y_m(k)|^2 > \tau$ to pass through the switch 408. The switch 408 switches under the control of the power detector 407, and the phase compensation unit 409 compensates for a phase of the signal $y_m(k)$ transmitted from the P/S converter 406. The hard-decision unit 416 performs a hard decision to output decision data for a signal phase-compensated by the phase compensation unit 409, and the quadrant detector 410 selects a quadrant of a signal outputted through the switch 408. Each of the adders 411-1 to 411-4 obtains a sum of signals in each section of the quadrant selected by the quadrant detector 410, and each of the averagers 412-1 to 412-4 obtains an average value for each section of the quadrant detected through each of the adders 411-1 to 411-4. Each of the inverters 413-1 to 413-4 performs a predetermined inversion for a real part and an imaginary part of an output signal of each of the averagers 412-1 to 412-4 according to a characteristic of each section of the quadrant. Each of the adders 414-1 to 414-4 adds a real part value of a signal of each of the inverters 413-1 to 413-4 to an imaginary part value of the signal, in order to obtain a phase error in each section of the quadrant. The adder 415 adds the phase errors in each section of the quadrant to each other, and the loop filter 417 adjusts a gain of the added phase error for each section of the quadrant. The VCO 418 generates an oscillation frequency by using the phase error of the loop filter 417, and outputs the oscillation frequency to the multiplier 402.

An operation of the apparatus according to the present invention will now be described. The baseband signal y(t), containing a residual frequency offset that is carried through the multiplication of the output signal of the VCO 418 by the band-pass signal, is applied to the FFT unit 405 via the A/D converter 403 and the S/P converter 404.

An FFT output value during one OFDM is subjected to the P/S conversion, and the QAM signal $y_m(k)$ of each subcarrier is applied to the power detector 407. The power detector 407 allows a signal which satisfies the condition $|Y_m(k)|^2 > \tau$ to pass through the switch 408. These signals become a high reliable SNR, and the power detector 407 allows only signals of angular point areas in a square similar to a QPSK to pass therethrough. An $m^{th}$ transmission baseband OFDM symbol passing through the FFT in an M-QAM-OFDM system is expressed by Equation 2.

$$S_m\left(\frac{T}{N}n\right) = \frac{1}{N}\sum_{k=0}^{N-1} X_m(k) \cdot \exp\left(j\frac{2\pi nk}{N}\right) \quad (2)$$

where, T represents a symbol period, N represents a number of a subcarrier, and n is a constant and has a value of 0, 1, 2, ..., N−1. Further, $X_m(k)$ represents an M-QAM transmission symbol having an order of $M=2^{2D}$ (D=0, 1, 2, ...)

An $m^{th}$ transmission OFDM output signal passing through a low pass filter and an RF local oscillator is expressed by Equation 3.

$$x(t) = \exp(j2\pi f_c t + \theta_i) \sum_{k=0}^{N-1} S_m\left(\frac{T}{N}k\right) \cdot h_t\left(t - \frac{T}{N}k\right) \quad (3)$$

where, $f_c$ represents a carrier frequency, and $h_t(t)$ represents an impact response of a transmitter low pass filter.

The transmission OFDM output signal is multiplied by a frequency of the VCO 418 in a receiver, and is expressed by Equation 4 including a frequency offset $\Delta f = f_c - \hat{f}_c$ and a phase offset $\theta_c = \theta_i - \theta_r$.

$$y(t) = \exp\{j(2\pi \Delta f t + \theta_c)\} \times \sum_{k=0}^{N-1} S_m\left(\frac{T}{N}k\right) \cdot h_c\left(t - \frac{T}{N}k\right) + w(t) \quad (4)$$

where, $h_c(t)$ is an impact response function representing a channel and a transceiving filter, and $\hat{f}_c$ represents an estimated frequency offset. Further, $\theta_i$ represents an initial phase of a transmitter, $\theta_r$ represents an initial phase of a receiver, and $w(t)$ represents Additive White Gaussian Noise (hereinafter, referred to as an AWGN) the average of which is zero and the dispersion of which is $\sigma_n$.

When it is assumed that $h_c(t)$ has a sampling interval of $T/N$ and is a filter which satisfies an Nyquist condition, the signal $y(t)$ sampled at an optimal time and to be inputted to the FFT unit 405 in the receiver may be expressed by Equation 5.

$$y_m(n) = S_m(n)\exp\left\{j\left(\frac{2\pi n\varepsilon}{N} + \theta_c\right)\right\} + w_m(n) \quad (5)$$

where, $\varepsilon$ is $\Delta fT$ and represents a normalized frequency offset and $w_m(t)$ represents an AWGN sample transmitted at an $n^{th}$ transmission of samples.

When an FFT having a predetermined value N is taken, equation 5 is expressed by Equation 6.

$$Y_m(k) = FFT_N[y_m(n)] \quad (6)$$
$$= \sum_{l=0}^{N-1} y_m(l) \cdot \exp\{-j(2\pi kl)\} + w_m(k)$$

where, when Equation 5 is substituted into Equation 6 and readjusted, Equation 6 may be expressed as Equation 7.

$$Y_m(k) = X_m(k)I_m(0) + \sum_{l=0, l\neq k}^{N-1} X_m(l)I_m(l-k) + w_m(k) \quad (7)$$

where, $I_m(l-k)$ represents an ICI coefficient of an $l^{th}$ subcarrier and an $k^{th}$ subcarrier and is expressed by Equation 8.

$$I_m(l-k) = \frac{\sin\pi(l-k+\varepsilon)}{N\sin\frac{\pi}{N}(l-k+\varepsilon)} \cdot \exp\left\{j\frac{\pi}{N}(N-1)(l-k+\varepsilon)\right\} \cdot \exp(j\theta_c) \quad (8)$$

In Equation 7, the right side of the equation may be expressed in the following two parts if $w_m(k)$ is excluded from the right side of the equation. One is a required signal component and the other is an ICI component.

It is necessary to consider both parts in order to understand the operating principle of the present invention.

If $\varepsilon$ is zero, Equation 7 is shortly expressed by an equation $$Y_m(k) = X_m(k) \cdot \exp(j\theta_c) + w_m(k),$$

all the demodulated data is subject to a phase rotation due to a phase offset, and an influence of the AWGN may exist. In contrast, if $\varepsilon$ is not zero, a first item $x_m(k)I_m(0)$ may be expressed as Equation 9.

$$X_m(k)I_m(0) = X_m(k)\frac{\sin\pi\varepsilon}{N\sin\frac{\pi\varepsilon}{N}} \cdot \exp\left\{\frac{j\pi\varepsilon(N-1)}{N}\right\} \cdot \exp(j\theta_c) \quad (9)$$

where, in view of Equation 9, not only a phase offset but also an amplitude distortion of $\sin(\pi\varepsilon)/(N\sin(\pi\varepsilon/N))$ occur due to the frequency offset.

Figure 1A:
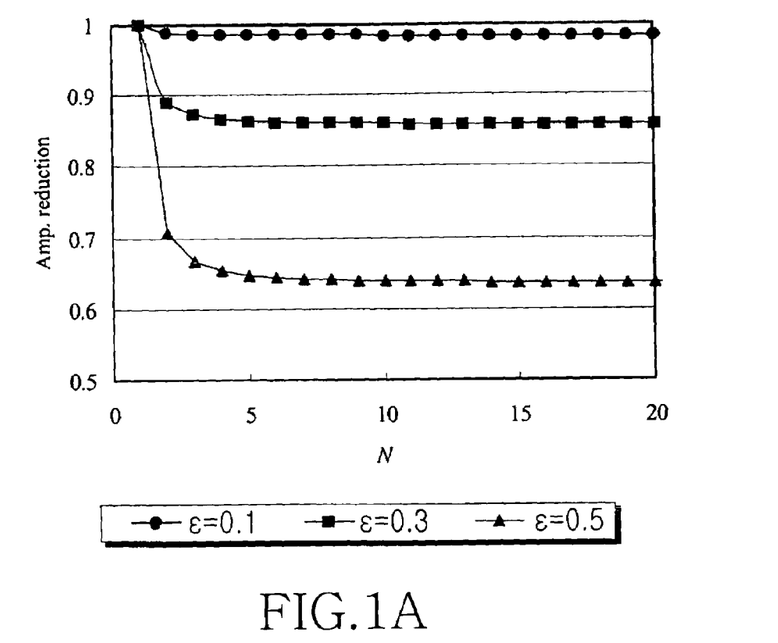
FIGS. 1A and 1B are graphs illustrating a reduction characteristic of signal amplitude and a phase rotation due to the frequency offset in an OFDM system.
Figure 1B:
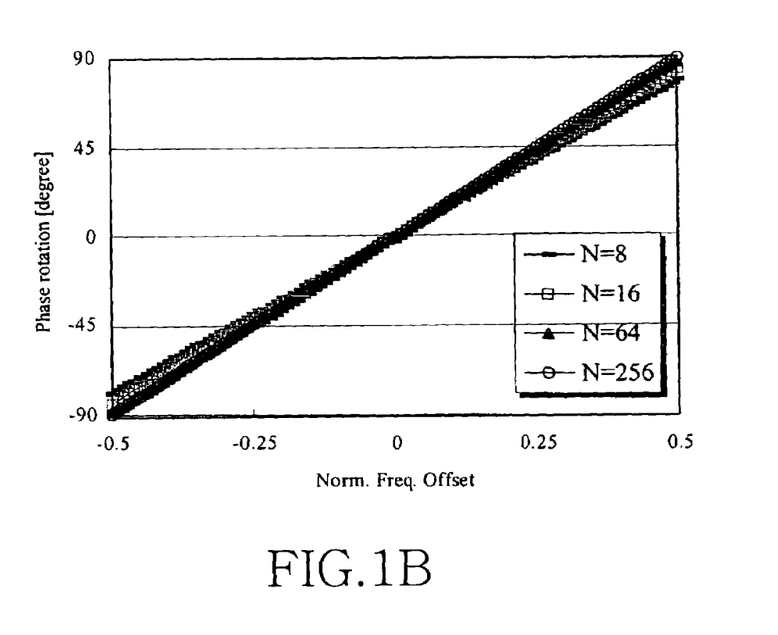

FIGS. 1A and 1B are graphs illustrating a reduction characteristic of signal amplitude and a phase rotation due to the frequency offset in an OFDM system.

FIG. 1A illustrates the reduction of the signal amplitude due to the frequency offset.

As shown in FIG. 1A, the signal amplitude is reduced as the frequency offset ($\varepsilon$) is increased through 0.1, 0.3, or 0.5.

When the FFT value N is greater than 8, a signal of amplitude '1' has an amplitude of about 0.98 when the frequency offset is 0.1. The signal has an amplitude of about 0.86 when the frequency offset is 0.3, and the signal has an amplitude of about 0.65 when the frequency offset is 0.5.

As shown in FIG. 1A, as the frequency offset increases, the signal amplitude is greatly reduced. As the value N increases up to 8, the signal amplitude is also greatly reduced. When the value N is greater than 8, the signal amplitude is no longer dependant to the value N. This phenomenon relates to the fact that a signal to interference power ratio (SIR) is independent from the value N when the value N is greater than 8.

FIG. 1B is a graph illustrating the phase rotation due to the frequency offset.

FIG. 1B illustrates changed rotation angles of the signal according to the frequency offset changes in each QAM. When the frequency offset is zero, the phase rotation is zero. However, when the frequency offset changes from −0.5 to 0.5, the phase also rotates from about −90° to +90°.

When the value N is significantly large, a phase rotation degree in relation to $\varepsilon$ is represented as $\pi\varepsilon$ (i.e., the phase rotation degree is 45° when $\varepsilon$ is 0.25 and the phase rotation degree is 90° when $\varepsilon$ is 0.5). This fact is used in analyzing an S-curve characteristic of a phase detector with respect to the frequency offset.

A second element in equation 7 is an element related to the ICI. The element includes an ICI sum between subcarriers except for a corresponding demodulation subcarrier. As $\varepsilon$ increases, an undesired element $|I_m(l-k)|$ gradually increases and distorts the signal. This makes it difficult to estimate the frequency offset and the phase offset in a frequency domain on the basis of a symbol.

The QAM modulated signal $X_m(k)$ may be divided into a real item $X_m^R(k)$ and an imaginary item $X_m^I(k)$, expected values $|X_m^R(k)|=|X_m^I(k)|$ of two items are zero, and their correlation is $E|X_m(k)X_m^*(k)|=|X_m(k)|^2\delta_{kl}$. $\delta_{kl}$ represents an Kronecker delta function. An average of the data of the modulated subcarriers is zero and the data are not correlated with each other.

Figure 2A:
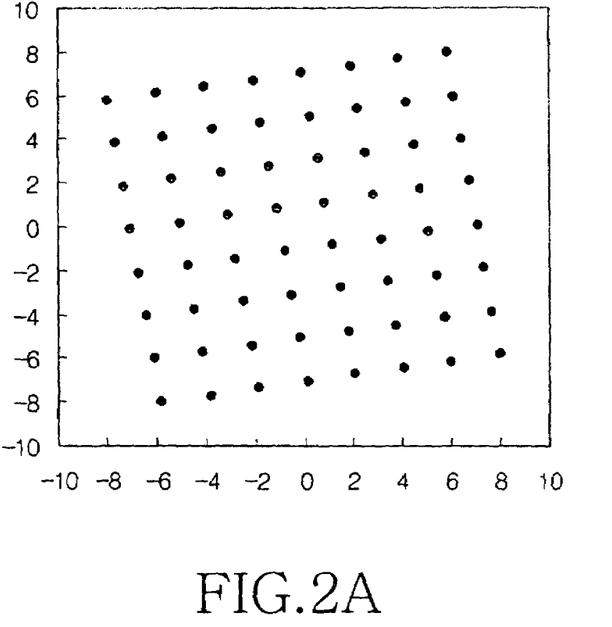
FIGS. 2A to 2C are diagrams illustrating characteristics of a received data constellation plot when the frequency offset exists.
Figure 2B:
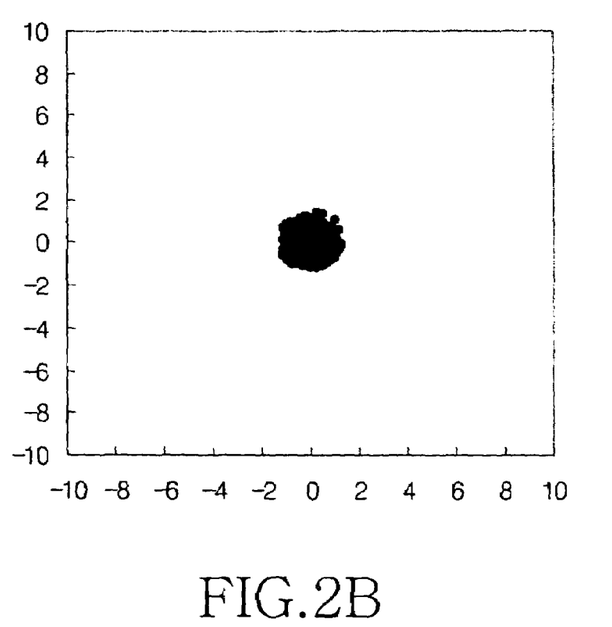
Figure 2C:
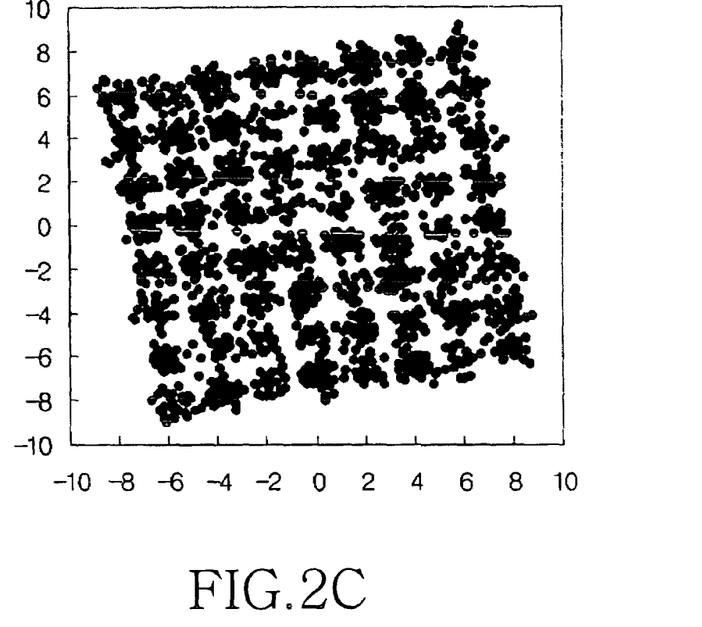

FIGS. 2A to 2C are graphs illustrating the characteristics of the received data constellation plot when the frequency offset exists.

In a simulation condition in FIGS. 2A to 2C, it is assumed that N is 2048, 64 QAM, $\epsilon$ is 0.05, and $\theta_e$ is 0.

In FIG. 2A, the signal amplitude is reduced by 0.0041 and a phase rotation by 9 (=0.05π) occurs from Equation 7.

In FIG. 2B, the ICI component distributes around '0' and has a characteristic in which an average is zero. As expressed by Equation 7, when the ICI component is added to the first element, the ICI component is displayed as shown in FIG. 2C, similar to an AWGN signal constellation plot.

Figure 3:
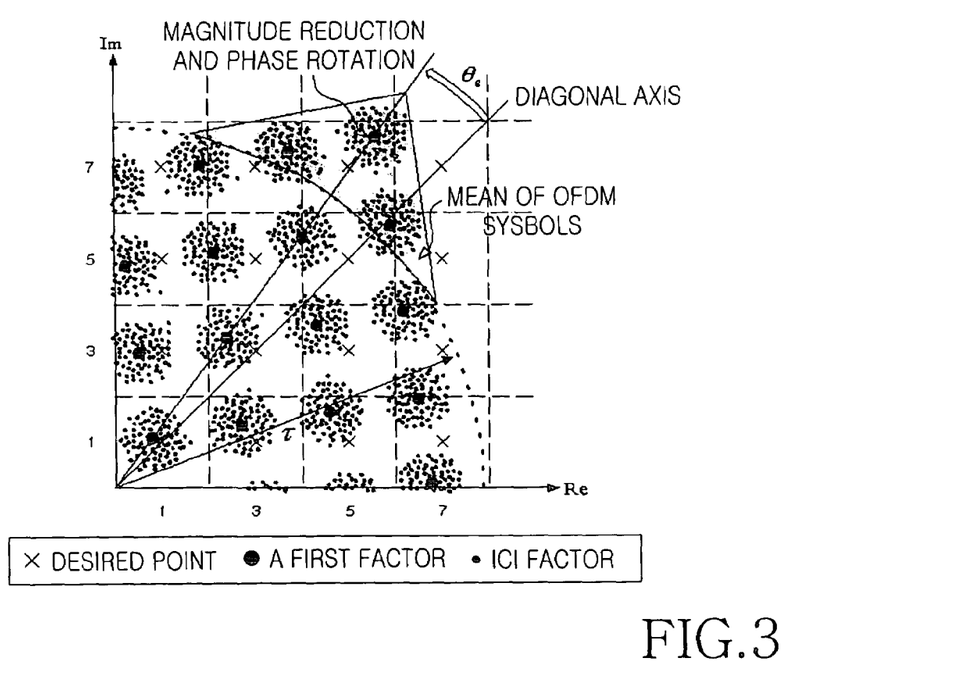
FIG. 3 is a diagram illustrating an entire constellation plot according to a frequency offset.

FIG. 3 illustrates an entire constellation plot according to a frequency offset for application of the present invention.

FIG. 3 illustrates a constellation plot of a first quadrant of 64 QAM. When the frequency offset exists, similar to the description in relation to the above analysis of the ICI, the signal amplitude of the first element is reduced and the phase rotation occurs in proportion to the frequency offset ($\theta_e$ from a diagonal axis) in the entire constellation plot. The ICI component distorts signals in manner similar to that of the AWGN.

Figure 7:
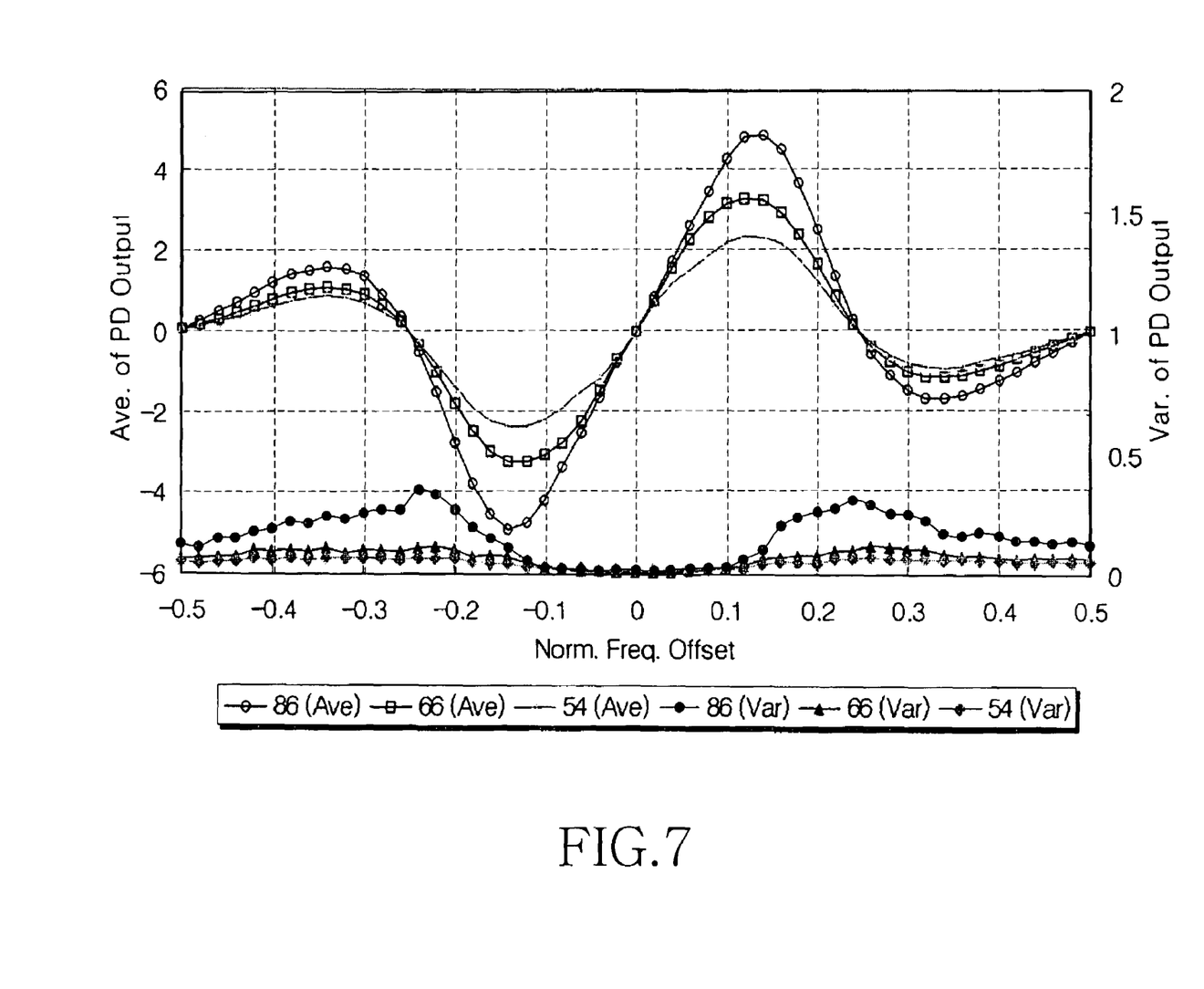
FIG. 7 is a chart illustrating an S-curve according to power detection critical values in an embodiment of the present invention.

When selecting only signals from among the signals located outside a predetermined radius and obtaining an average of the selected signals, a position of a signal is determined at a position of the first element in FIG. 7 due to a QAM symbol characteristic, an ICI component, and a 0 average characteristic of the AWGN, which may occur at the same probability.

On the basis of such a principle, the residual frequency and the phase offset can be compensated for through the phase rotation degree rotated from a diagonal axis.

Since a high SNR signal of the diagonal axis area is used, the residual frequency can be robustly and quickly captured.

FIG. 4 illustrates a residual frequency offset estimation closed-loop including a proposed Quadrant Detector (QD) phase detector. Herein, it is assumed that an approximate fine frequency synchronization and equalization have already been performed, and the FFT output $Y_m(k)$ includes the ICI introduced by the residual frequency offset.

On the basis of the aforementioned assumption, each M-QAM signal $Y_m(k)$ is applied to the power detector 407. The power detector 407 detects a signal satisfying the condition $|Y_m(k)|^2 > \tau$ to apply the detected signal to the quadrant detector 410 through the switch 408.

The quadrant detector 410 divides signals, which are detected by the power detector 407 for one OFDM symbol, according to each section of the quadrant, and the divided signals are used in detecting a phase error.

Signals, in which QAM symbols contained in the subcarrier of the $m^{th}$ OFDM symbol are divided into each section of the quadrant and added to each other, may be expressed by mean complex signal values $q_1(m)$, $q_2(m)$, $q_3(m)$, and $q_4(m)$ (output signals of the averagers 412-1 to 412-4) according to each quadrant. Herein, $q_j(m)$ represents a mean complex signal of an $j^{th}$ quadrant for the $m^{th}$ OFDM symbol. As described above, since a mean of the selected OFDM symbol is taken, the compensation for the phase error according to an embodiment of the present invention is not sensitive to the AWGN and the ICI.

Since these values represent current phases for each section of the quadrant of the OFDM signal received at an $m^{th}$ reception of the signals, the phase error may be calculated by means of the signal and representative signals $(1+j)/\sqrt{2}, (-1+j)/\sqrt{2}, (-1-j)/\sqrt{2}$, and $(1-j)/\sqrt{2}$ located at diagonal positions of each section of the quadrant.

The phase error may be obtained by subtracting a phase of a transmission signal from a phase of a received signal by means of an arctangent function, or the phase error may be obtained by an equation $I_m$(received signal/transmission signal).

In an embodiment of the present invention, in order to avoid the realization complexity of the arctangent function, phase error signals of each section of the quadrant are finally achieved by means of Equation 10.

$$\psi_1(m) = -q_1^R(m) + q_1^I(m)$$
$$\psi_2(m) = -q_2^R(m) - q_2^I(m)$$
$$\psi_3(m) = q_3^R(m) - q_3^I(m)$$
$$\psi_4(m) = q_4^R(m) + q_4^I(m) \quad (10)$$

where, $\psi_j(m)$ represents a phase error of the $m^{th}$ OFDM symbol in an j quadrant.

The phase error may be obtained by applying Equation 10 to a real part and an imaginary part of an average signal value in each section of the quadrant. A construction of the present invention for such a system as expressed by Equation 10, is shown by the construction of a system including the adders, averagers, inverters, and adders, shown as reference numerals 411-1 to 414-4, in FIG. 4, and the phase error may be obtained by means of a simple inversion as shown in FIG. 4.

A phase error of an $n^{th}$ OFDM signal is obtained by Equation 11.

$$\psi_{Ave}(m) = \frac{1}{4} \sum_{j=1}^{4} \psi_j(m) \quad (11)$$

However, "¼" in Equation 11 used for taking a mean of the phase errors in each section of the quadrant may be omitted in an actual embodiment. Instead, a gain of the loop filter 417 is reduced by ¼, thereby obtaining the mean of the phase errors.

Since an algorithm according to the present invention is an algorithm of estimating the residual frequency and the phase through the phase detector having a phase error detection characteristic, the S-curve must show an output characteristic of a detected phase error with respect to the phase offset. When an evaluation is performed only for the phase offset, since an ICI influence due to the frequency offset is not considered, such an S-curve does not possess any particular significance. Accordingly, the present invention shows an S-curve of a phase error output characteristic for the frequency offset on the basis of the following assumption.

A phase error $\theta_e(m)$ of each initial symbol is fixed at 0 and a corresponding frequency offset is applied in order to consider a phase error detection characteristic for the received signal $Y_m(k)$. A predetermined frequency offset causes a predetermined phase change in the OFDM system.

Analyzing the S-curve on the basis of the assumption results in the output characteristic of the detected phase error including the ICI due to the frequency offset.

Figure 5:
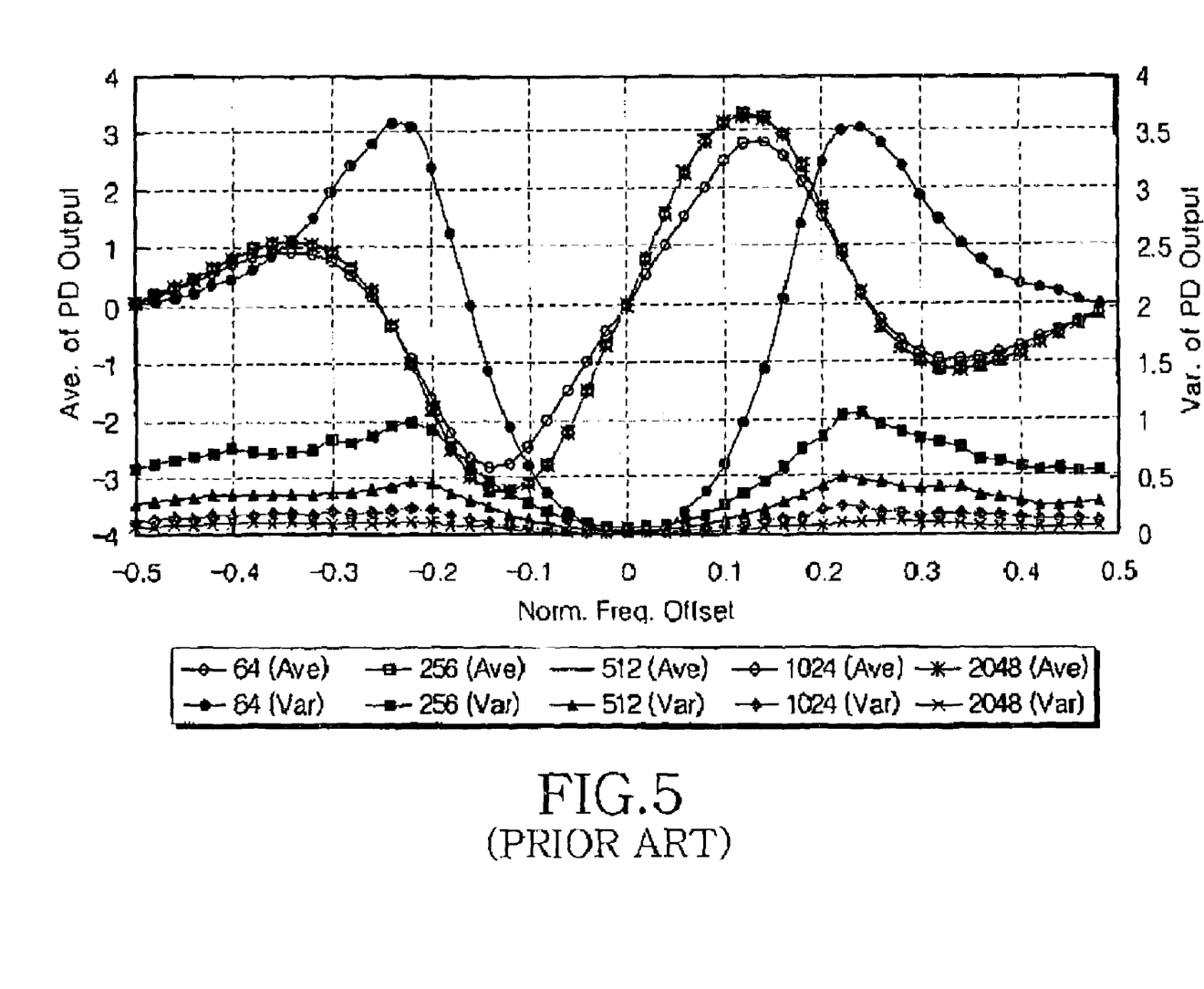
FIG. 5 is a chart illustrating an S-curve according to the prior art.

Before considering the S-curve according to the present invention, an S-curve according to a QAM order in the existing DD channel estimation method is shown in FIG. 5.

As shown in FIG. 5, in the conventional DD channel estimation method, a phase error in a QAM symbol of each subcarrier is detected as $I_m(Y_m(k)/\hat{X}_m(k))$ by means of the FFT demodulated signal $Y_m(k)$ and a transmission signal $\hat{X}_m(k)$ obtained through performing a hard-decision for the signal $Y_m(k)$.

As shown in FIG. 5, a zero crossing occurs at values of ±0.25. That is, when N is significantly large, the frequency offset of ±0.25 corresponds to phase errors of ±45°, the zero crossing occurs over a period of one quadrant phase range (90°) corresponding to an estimation range of a phase detector. As shown in FIG. 5, a linear interval of the S-curve is shortened as the order of the QAM increases. Further, in a dispersion, a similar dispersion characteristic is shown in a narrow frequency offset range regardless of the order of the QAM. In contrast, in a wide frequency offset range, a large dispersion occurs as the order of the QAM is decreased. This is because an estimation value of the S-curve is relatively large.

Since the conventional DD channel estimation method has a very high dispersion value, it is impossible to apply the method itself to the OFDM system.

Figure 6:
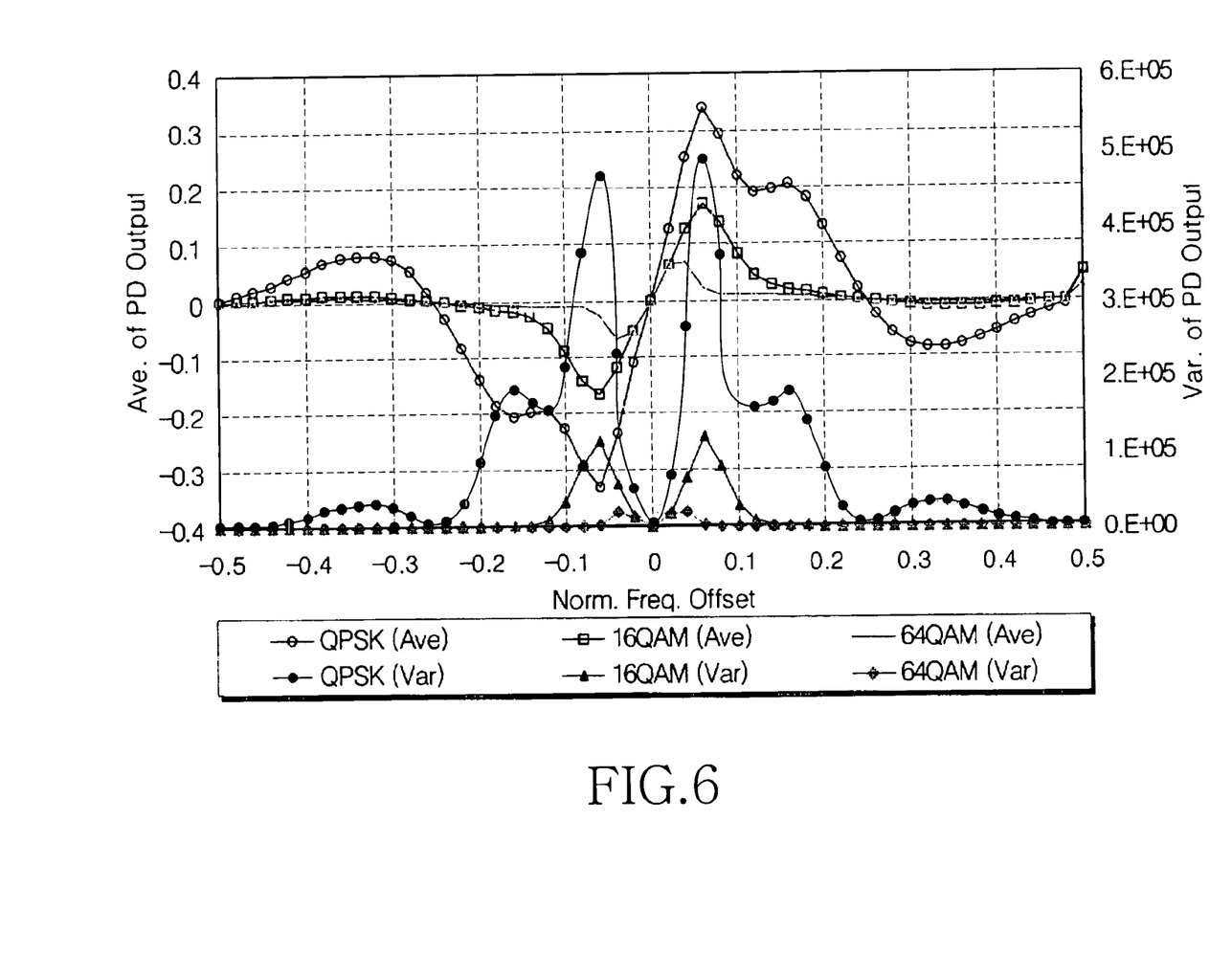
FIG. 6 is a chart illustrating an S-curve according to an FFT value using a quadrant decision algorithm according to the present invention.

FIG. 6 illustrates an S-curve according to an FFT value using a quadrant decision algorithm according to the present invention.

In a simulation condition in FIG. 6, a 64 QAM is used and $\tau^2$ is set at 66.

As shown in FIG. 6, the S-curve according to the FFT value using the quadrant decision algorithm according to the present invention has a very low dispersion characteristic.

In the S-curve according to the FFT value using the quadrant decision algorithm through the system shown in FIG. 4, as the FFT value increases, an S-curve gain slightly increases and the dispersion characteristic lowers. As the FFT value increases, superior S-curve characteristics are exhibited.

This is due to the fact that many QAM symbols may be used in one OFDM symbol, so superior performance is realized in view of a statistical average characteristic.

The embodiment according to the present invention may be applied to an FFT having a small value.

When it is assumed that the same sampling speed is employed, a time required for updating the VCO in the closed-loop is shortened as the FFT value decreases. If the loop filter is realized with a lesser gain, a stable estimation performance can be ensured.

A stable performance can be maintained regardless of the FFT value.

Table 1 shows a critical signal power for passing a high SNR symbol in the power detector and symbols corresponding to the critical signal power on the basis of 64 QAM in the embodiment of the present invention.

TABLE 1

| Power level (unnormalized) | Critical power value ($\tau^2$) | Corresponding symbol position (for a first quadrant) | probability |
|---|---|---|---|
| 98 | 86 | (7, 7) | 1/16 |
| 74 | 66 | (5, 7) (7, 5) | 3/16 |

TABLE 1-continued

| Power level (unnormalized) | Critical power value ($\tau^2$) | Corresponding symbol position (for a first quadrant) | probability |
|---|---|---|---|
| 58 | 54 | (3, 7) (7, 3) | 5/16 |
| 50 | | (5, 5) (1, 7) (7, 1) | 8/16 |

Table 1 illustrates the case where the ICI does not exist. If the frequency offset exists, since power of a first element of a signal is reduced, the symbol detection probability will be reduced further than the probabilities shown in table 1.

When the algorithm according to the present invention is employed, it is necessary to set power detection to critical values, considering the aforementioned point.

FIG. 7 illustrates an S-curve according to the power detection of critical values in an embodiment of the present invention.

In a simulation condition in FIG. 7, 2048 FFT and 64 QAM are employed.

As shown in FIG. 7, as the critical value increases, the slope of the S-curve increases while slightly increasing a dispersion characteristic. Since a low dispersion occurs in a normal state, it is preferred to set the critical values to relatively high values in order to reduce a pattern jitter if the FFT value is large enough.

If the FFT value is small, it is preferred to set the critical values to relatively low values to increase the symbol detection probability.

The present invention as described above can compensate for a residual frequency over a relatively wide range.

Further, the present invention can improve transmission efficiency by estimating a phase error by using FFT output data.

Furthermore, the present invention estimates a residual frequency offset with a stable characteristic and compensates for a phase, thereby effectively removing an ICI, in comparison with the prior art in which a residual frequency offset remains because only a phase is compensated for by means of a pilot in a frequency domain, and an ICI inevitably exists.

The above-mentioned method according to the present invention can be realized as software and can be stored in a recoding medium such as a CD ROM, an RAM, a floppy disk, a hard disk, or a magneto-optical disk, so that a user can read such software by using a computer.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for compensating for a residual frequency offset in an orthogonal frequency division multiplexing system, comprising the steps of:
   a) performing a fast Fourier transform for an input signal to convert the input signal into a serial signal;
   b) detecting signal power of the serial signal to control the pass through of a signal greater than a predetermined critical value;
   c) selecting a section of a quadrant for each passed signal;
   d) estimating a phase error in each section of the quadrant for one orthogonal frequency division multiplexing symbol with respect to the selected section of the quadrant; and e) frequency-oscillating a signal based on the estimated phase error, generating the input signal by multiplying an oscillated signal by a band-passed signal, and returning to step a).

2. The method as claimed in claim 1, wherein step a) includes the steps of:
f) converting the input signal into a digital signal;
g) converting the digital signal into parallel signals; and
h) performing a fast Fourier transform on the parallel signals and converting the parallel signals into a serial signal.

3. The method as claimed in claim 1, wherein the power detection in step b) is performed by, $$|Y_m(k)|^2 > \tau,$$

where $Y_m(k)$ represents an $k^{th}$ subcarrier signal of an $m^{th}$ orthogonal frequency division multiplexing symbol and $\tau$ represents a critical value.

4. The method as claimed in claim 2, wherein the power detection in step b) is performed by, $$|Y_m(k)|^2 > \tau,$$

where $Y_m(k)$ represents an $k^{th}$ subcarrier signal of an $m^{th}$ orthogonal frequency division multiplexing symbol and $\tau$ represents a critical value.

5. An apparatus for compensating for a residual frequency offset in an orthogonal frequency division multiplexing system, the apparatus comprising:
a fast Fourier transform unit for performing a fast Fourier transform for an input signal to convert the input signal into a serial signal;
a power detector for detecting signal power of an output signal of the fast Fourier transform unit to control the passthrough of a signal greater than a predetermined critical value;
a quadrant detector for selecting a section of a quadrant for each passed signal;
a phase error estimation unit for estimating a phase error in each section of the quadrant for one orthogonal frequency division multiplexing symbol with respect to the selected section of the quadrant; and
a voltage controlled oscillator for frequency-oscillating a signal based on the estimated phase error, generating the input signal by multiplying an oscillated signal by a band-passed signal, and inputting the input signal to the fast Fourier transform unit.

6. The apparatus as claimed in claim 5, wherein the phase error estimation unit estimates the phase error by using a SNR signal greater than a predetermined critical value and a representative signal located on a diagonal axis of a constellation plot.

7. A computer program device readable by a machine, tangibly embodying a program of instructions executable by the machine to perform the method steps for a method for compensating for a residual frequency offset in an orthogonal frequency division multiplexing system, comprising the steps of:
a) performing a fast Fourier transform for an input signal to convert the input signal into a serial signal;
b) detecting signal power of the serial signal to control the pass through of a signal greater than a predetermined critical value;
c) selecting a section of a quadrant for each passed signal);
d) estimating a phase error in each section of the quadrant for one orthogonal frequency division multiplexing symbol with respect to the selected section of the quadrant; and
e) frequency-oscillating a signal based on the estimated phase error, generating the input signal by multiplying an oscillated signal by a band-passed signal, and returning to step a).

* * * * *